United States Patent
Thoma et al.

(10) Patent No.: US 12,116,083 B2
(45) Date of Patent: Oct. 15, 2024

(54) BICYCLE BATTERY ASSEMBLY

(71) Applicant: Canyon Bicycles GmbH, Koblenz (DE)

(72) Inventors: Vincenz Thoma, Obermaiselstein (DE); Patrick Schmidt, Koblenz (DE); Philipp Klein, Koblenz (DE); Christian Parmenter, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 525 days.

(21) Appl. No.: 17/489,903

(22) Filed: Sep. 30, 2021

(65) Prior Publication Data
US 2022/0106013 A1 Apr. 7, 2022

(30) Foreign Application Priority Data
Oct. 1, 2020 (DE) .................... 20 2020 105 636.0

(51) Int. Cl.
*B62M 6/90* (2010.01)
*B62J 43/20* (2020.01)
*B62K 19/40* (2006.01)

(52) U.S. Cl.
CPC ............... *B62M 6/90* (2013.01); *B62J 43/20* (2020.02); *B62K 19/40* (2013.01)

(58) Field of Classification Search
CPC ..................................................... B62M 6/90
See application file for complete search history.

(56) References Cited

U.S. PATENT DOCUMENTS

| 11,161,567 | B2 * | 11/2021 | Eguchi | B62K 19/40 |
| 2019/0337588 | A1 * | 11/2019 | Wecker | B62K 19/40 |
| 2020/0062339 | A1 | 2/2020 | Talavasek et al. | |
| 2020/0062342 | A1 | 2/2020 | Talavasek et al. | |
| 2020/0247502 | A1 | 8/2020 | Mitsuyasu et al. | |
| 2024/0124093 | A1 * | 4/2024 | Mishima | B62M 6/55 |

FOREIGN PATENT DOCUMENTS

| DE | 102020100724 A1 | 8/2020 | |
| DE | 102019213426 A1 | 3/2021 | |
| DE | 102019213435 A1 | 3/2021 | |
| EP | 3590814 A1 | 1/2020 | |
| JP | 2018118715 A | 8/2018 | |
| WO | WO-2023078778 A1 * | 5/2023 | B60L 50/66 |

* cited by examiner

*Primary Examiner* — Kevin Hurley
(74) *Attorney, Agent, or Firm* — The Webb Law Firm

(57) ABSTRACT

A bicycle battery assembly comprises a bicycle frame tube, such as a down tube. A battery is adapted to be inserted through a battery opening in the longitudinal direction of the bicycle frame tube. For allowing for a simple fixing of the battery to the bicycle frame tube, in particular by means of screws, an installation aid is connected to the battery and/or the bicycle frame tube, in particular in the area of the battery opening. The installation aid allows for an easy installation since in particular screw holes in the bicycle frame tube are flush with threaded bore holes in the battery.

16 Claims, 4 Drawing Sheets

BICYCLE BATTERY ASSEMBLY

CROSS-REFERENCE TO RELATED APPLICATION

This application claims priority to German Patent Application No. 20 2020 105 636.0 filed Oct. 1, 2020, the disclosure of which is hereby incorporated by reference in its entirety.

BACKGROUND OF THE DISCLOSURE

The disclosure relates to a bicycle battery assembly.

DESCRIPTION OF RELATED ART

In the case of e-bikes it is known to arrange the battery in the bicycle frame. Frequently, the battery is arranged in the area of the down tube of the bicycle frame. For example, the battery is fixed to the outside of the down tube, wherein the down tube can comprise a recess facing to the outside, in which recess the battery is fixed. When batteries are arranged inside a bicycle frame tube, in particular a down tube of a bicycle frame, it is required to fix the batteries inside the frame tube. Fixing is realized by means of screws, for example, which are inserted through openings in the bicycle frame tube and screwed into threaded bore holes of the battery, in particular the battery housing. For this purpose, it is required that the threaded bore holes of the battery are flush with the through-going bore holes in the bicycle frame tube. The battery is usually inserted in that the bicycle is turned upside down or laid down so that the battery can be easily inserted. In particular when the bicycle is turned upside down, the battery must be kept in a proper position by hand, while the screws are screwed into the threaded bore holes through the through-going bore with the other hand. Such an adjustment is a relatively complicated process. Further, it is known to provide a stopper inside the bicycle frame tube. Said stopper ensures that the battery is not inserted too far into the frame at least in the longitudinal direction. A lateral adjustment must nevertheless be performed by hand for inserting the screws for the purpose of fixing the battery. Further, the installation of a stopper arranged in the frame tube is a complex process.

SUMMARY OF THE DISCLOSURE

It is an object of the disclosure to provide a bicycle battery assembly which is easy to install.

According to the disclosure, the object is achieved with a bicycle battery assembly having the features of claim 1.

The bicycle battery assembly according to the disclosure comprises a bicycle frame tube which is in particular a down tube of a bicycle frame. The bicycle frame tube comprises a battery opening. Preferably, the latter is an opening arranged at a longitudinal side or front side of the bicycle frame tube. In particular, the battery opening is arranged at the bottom-bracket-side end of the down tube. A battery can be placed or inserted into the bicycle frame tube via the battery opening in the longitudinal direction. The battery usually includes a battery housing which in particular comprises a plurality of battery cells, a controller, a charging connection and the like. According to the disclosure, the battery and/or the bicycle frame tube have connected thereto an installation aid for defining an installation position. In particular, the installation aid is arranged in the area of the battery opening which is preferably provided at the bottom-bracket-side end of the down tube. The installation aid allows for the battery to be easily adjusted or secured in an installation position such that the battery can be easily fastened in the bicycle frame tube by means of fixing elements. The fixing elements can in particular be one or a plurality of screws which are respectively inserted into a screw hole provided in the bicycle frame tube and screwed into a threaded bore hole provided in the battery, in particular the battery housing.

According to a preferred embodiment of the disclosure, the installation aid comprises a boss facing in the longitudinal direction. The longitudinal direction of the bicycle frame tube preferably corresponds to the insertion direction of the battery. The boss is preferably configured such that, with the battery in the inserted position, the boss engages over a side wall of the bicycle frame tube. Thus, in the inserted position, a portion of the boss abuts on an outside of the bicycle frame tube. Alternatively or additionally, the boss can cooperate with a projection provided at the battery such that the functional direction is at least partially reversed. Such a boss allows the battery to be adjusted in at least one direction. In the case of a down tube into which the battery is inserted, the boss in particular serves for a vertical adjustment.

According to a particularly preferred aspect of the disclosure, the installation aid comprises a locating surface which cooperates with an abutment surface provided at the bicycle frame tube or the battery. When the battery is placed or inserted into the bicycle frame tube, the locating surface thus abuts on the abutment surface. This serves in particular for adjusting the battery relative to the bicycle frame tube in the longitudinal or insertion direction.

The locating surface as well as the abutment surface are preferably complementary to each other. It is preferred that the locating surface and/or the abutment surface partially extend in the longitudinal direction. At least one of the two surfaces does thus not extend only vertically to the longitudinal or insertion direction. Thereby, in addition to an adjustment in the longitudinal direction, a lateral adjustment is also possible. It is particularly preferred that the locating surface and/or the abutment surface are bent in the longitudinal direction. An appropriate, in particular complementary bending of the two surfaces ensures good adjustment both in the longitudinal direction and the lateral direction.

For further facilitating the installation, it is particularly preferred that the locating surface or the abutment surface is funnel-shaped in the longitudinal direction. This configuration allows for an automatic adjustment and simple insertion. In addition, it is preferred that the locating surface or the abutment surface are wedge-shaped in the longitudinal direction. This configuration, too, facilitates the adjustment and the installation. It is particularly preferred that one of the two surfaces is funnel-shaped and the other surface is wedge-shaped or that they are preferably again complementary to each other.

According to a preferred aspect of the disclosure, the locating surface and/or the abutment surface are bent transversely to the longitudinal direction. Further, the locating surface or the abutment surface can be funnel-shaped transversely to the longitudinal direction. In addition, the locating surface or the abutment surface can be wedge-shaped transversely to the longitudinal direction. Again, a combination is preferred such that a very good vertical adjustment is ensured.

Preferably, the locating surface or the abutment surface is constituted by a side surface of the bicycle frame tube facing in the longitudinal direction. The surface is thus in particular constituted by a side surface of the battery opening.

The installation aid can be configured as a separate component which is connected to the battery, in particular the battery housing, via a screw, for example. This configuration allows for easily providing different installations aids depending on battery types or battery sizes, for example. This configuration, too, allows for an easy adaptation to different bicycle frames. It is also possible that the installation aid is integrally formed with the battery, in particular the battery housing. This facilitates the installation since no separate fastening of the installation aid to the battery is required.

According to a particularly preferred embodiment, the force transmission between the battery and the bicycle frame tube is essentially realized via fixing elements. In particular, at least a transmission of more than 70%, in particular more that 80% of the forces occurring during operation is realized. The fixing elements hold the battery in the insertion position in the bicycle frame tube. The fixing elements in particular include screws which are inserted through through-going openings in the bicycle frame tube and screwed into the bore holes. Here, the installation aid in particular provides a clearance fit for ensuring that no or only very small forces are transmitted via the installation aid.

In particular, the installation aid according to the disclosure offers the advantage that it is not arranged inside the frame tube and is thus very easy to install. In particular, no additional fastening means are required at the frame tube for installation purposes such that the frame is not weakened.

BRIEF DESCRIPTION OF THE DRAWINGS

Hereunder the disclosure will be explained in detail on the basis of a preferred embodiment with reference to the accompanying drawings in which.

DETAILED DESCRIPTION

Figure 1:
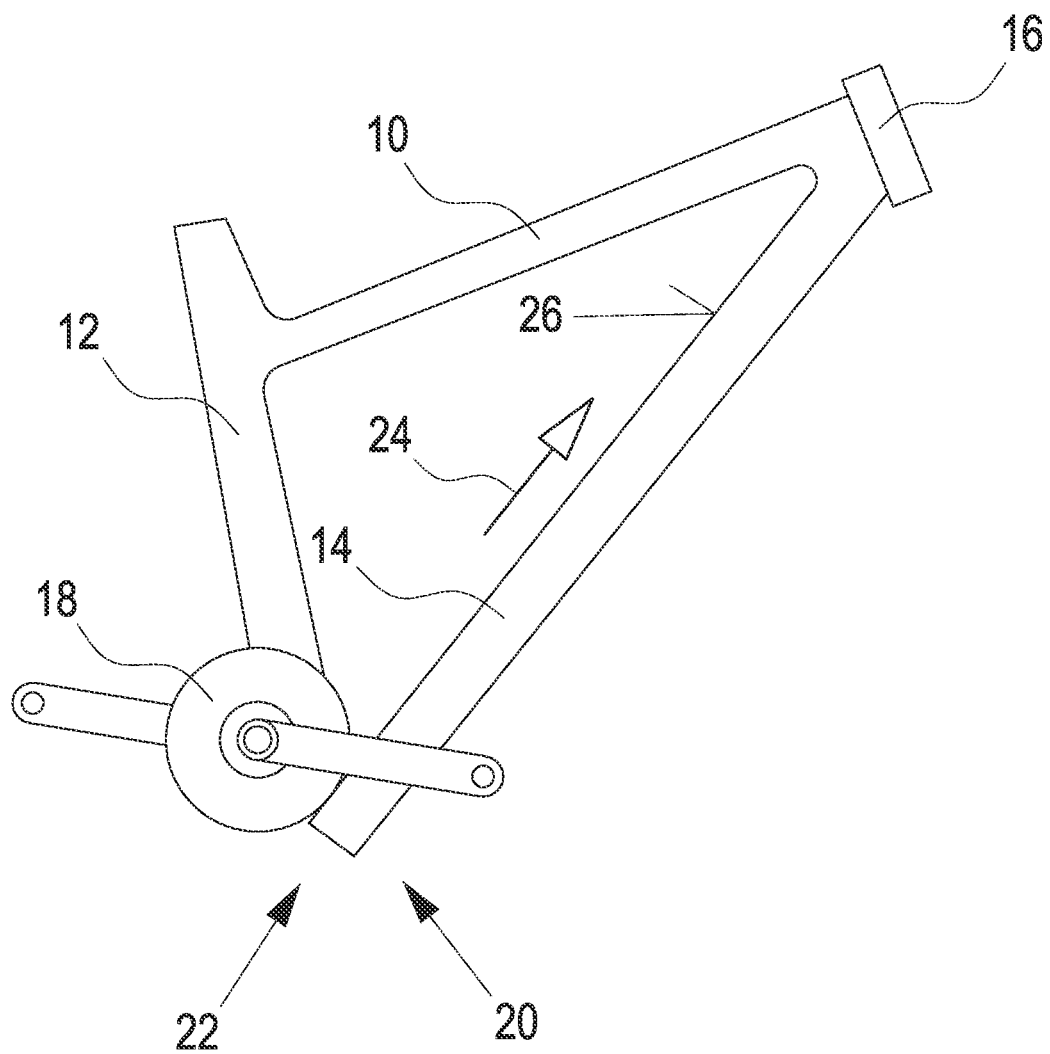
FIG. 1 shows a greatly simplified schematic side view of a bicycle frame.

A bicycle frame usually comprises a top tube 10, a saddle tube 12 connected to the top tube 10, a down tube 14 as well as a head tube 16 connected to the top tube 10 and the down tube 14. Further, a bottom bracket or motor housing 18 is provided serving for accommodating an electric motor of the bottom bracket. Other frame geometries are also known. In the illustrated exemplary embodiment, the down tube 14 is arranged such that a bottom-bracket-side end 20 of the down tube 14 comprises a battery opening 22. The battery opening 22 is thus arranged relative to a longitudinal direction 24 of the down tube 14. In the illustrated exemplary embodiment, a battery can be inserted into the battery opening 22 from below in the longitudinal direction 24.

In the illustrated exemplary embodiment, an installation aid as an additional component 28 is arranged at the battery 30 or a housing of the battery 30. The installation aid 28 cooperates with an area 32 of the down tube 14 such that the component 28 and the area 32 together constitute the installation aid, as elucidated in detail below.

Figure 3:
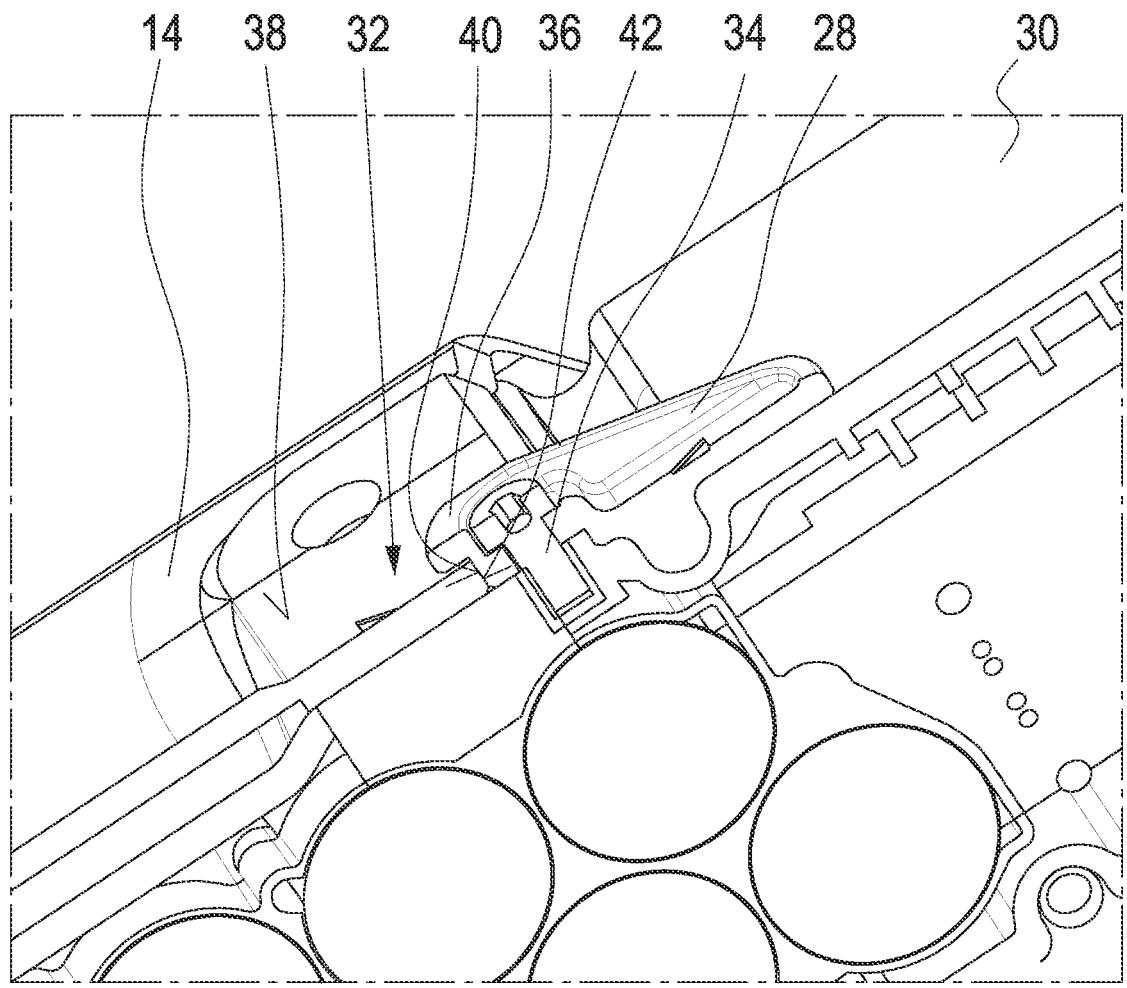
FIG. 3 shows a schematic sectional view in the longitudinal direction of the down tube in the area of the battery opening.

In the illustrated exemplary embodiment, the component 28 of the installation aid is fixed to the battery 30 by means of a screw 34. The component 28 of the installation aid comprises a boss 36 (FIG. 3). The latter engages over an outside 38 of the down tube 14. With the bicycle frame in an upright position (FIG. 1), the outside 38 faces downwards. The boss 36 which abuts on the outside 38 of the down tube 14 in the inserted condition of the battery 30 helps to realize a vertical orientation of the battery 30 in a simple manner.

The component 28 of the installation aid comprises a locating surface 40. In the inserted condition (FIG. 3), the locating surface 40 abuts on the abutment surface 42. The abutment surface 42 is the side surface of the lower wall of the down tube 14 defining the battery opening 22. The locating surface 40 and the abutment surface 42 help to adjust the battery 30 in the longitudinal direction 24.

Figure 4:
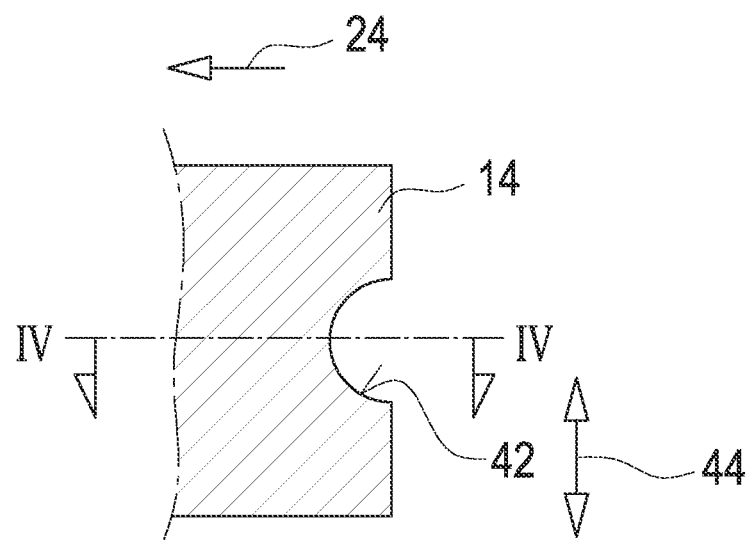
FIG. 4 shows a schematic top view of an outside of the down tube in the area of the battery opening.

The abutment surface 42 is preferably configured as a concavely bent recess in the corresponding side wall of the down tube 14 (FIG. 4). The locating surface 40 is preferably of a complementary configuration and thus convexly bent. With such a configuration of the surfaces 40, 42, the installation aid 28, 32 does not only realize an adjustment in the longitudinal direction 24 but also a lateral adjustment in the direction indicated by an arrow 44.

Figure 5:
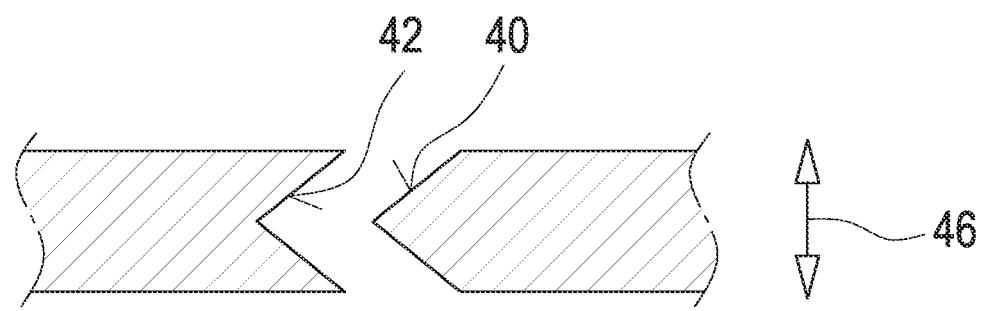
FIG. 5 shows a schematic sectional view along line IV-IV in FIG. 4.

As seen in a cross-sectional view, the abutment surface 42 can also be wedge-shaped, as illustrated in FIG. 5. Accordingly, the locating surface 40 is complementarily configured in a wedge shape or as a tapering surface. In the inserted condition, the surfaces 40, 42 abut on each other, wherein the embodiment illustrated in FIG. 5 allows for an easy vertical adjustment in the direction indicated by an arrow 46. In the configuration of the embodiment illustrated in FIG. 5 the boss 36 can be omitted, where appropriate.

Figure 2:
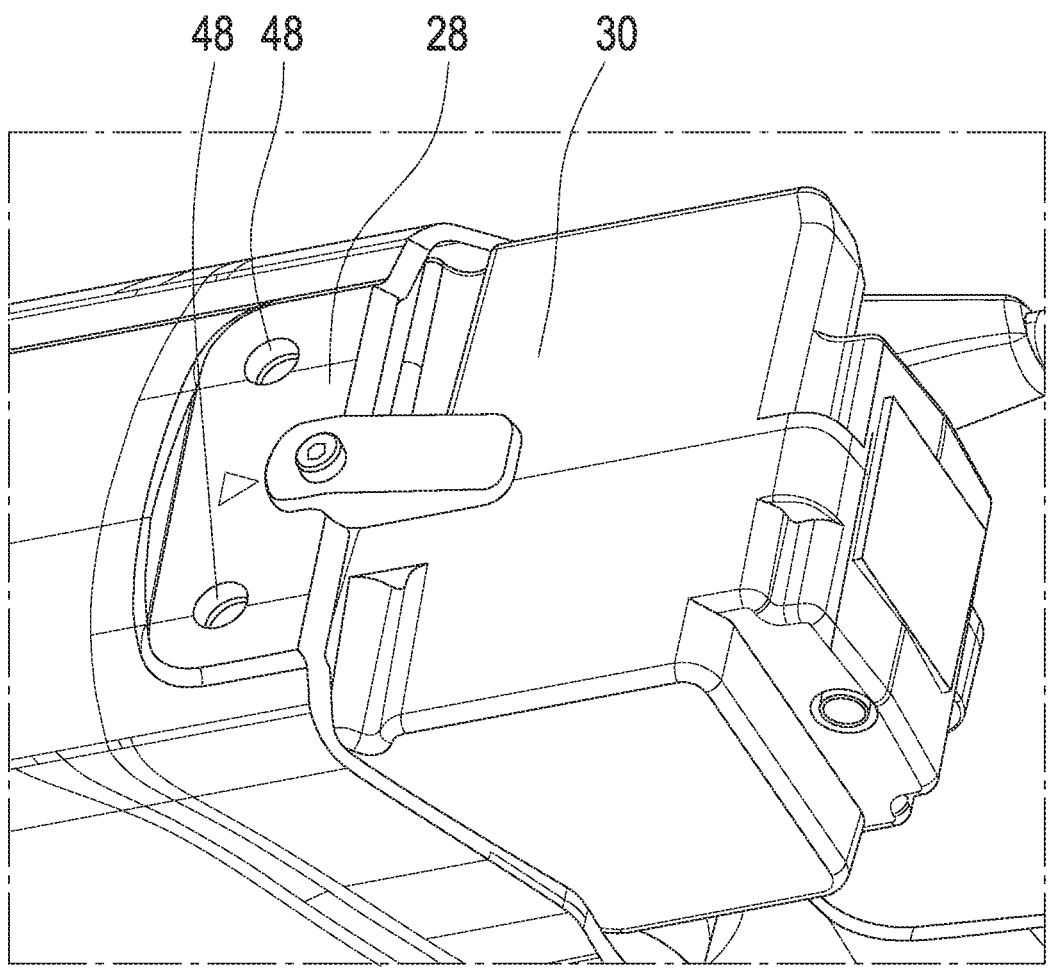
FIG. 2 shows a schematic perspective view of the down tube in the area of the battery opening.

After insertion of the battery 30 into the down tube 14 in the longitudinal direction 24, provision of the installation aid 28, 32 according to the disclosure allows for realizing an adjustment in such a manner that through-going openings 48 (FIG. 2) in the down tube 14 are flush with threaded bore holes in the battery or the battery housing. Thus, screws can easily be screwed into the bore holes for fixing the battery 30 in the down tube 14.

What is claimed is:

1. A bicycle battery assembly, comprising:
   a bicycle frame tube,
   a battery adapted to be inserted, in a longitudinal direction of the bicycle frame tube, into the latter through a battery opening, and
   an installation aid connected to the battery and/or the bicycle frame tube,
   wherein the installation aid comprises a boss facing in the longitudinal direction, the boss, in the inserted condition of the battery, engages over a side wall of the bicycle frame tube and/or cooperates with a projection provided at the battery.

2. The bicycle battery assembly according to claim 1, wherein the installation aid comprises a locating surface which cooperates with an abutment surface provided at the bicycle frame tube or the battery.

3. The bicycle battery assembly according to claim 2, wherein the locating surface and the abutment surface are complementary to each other.

4. The bicycle battery assembly according to claim 2, wherein the locating surface and/or the abutment surface partially extend in the longitudinal direction.

5. The bicycle battery assembly according to claim 1, wherein the installation aid comprises a locating surface and an abutment surface, the locating surface is convexly bent in the longitudinal direction and the abutment surface is concavely bent in the longitudinal direction.

6. The bicycle battery assembly according to claim 2, wherein the locating surface is convexly bent transversely to the longitudinal direction and the abutment surface is concavely bent transversely to the longitudinal direction.

7. The bicycle battery assembly according to claim 1, wherein the installation aid is integrally formed with the battery.

8. The bicycle battery assembly according to claim 1, wherein a force transmission between the battery and the bicycle frame tube essentially takes place via a fixing element by means of which the battery is held in the bicycle frame tube.

9. The bicycle battery assembly according to claim 1, wherein the bicycle frame tube is a down tube.

10. The bicycle battery assembly according to claim 1, wherein the installation aid connected to the battery and/or the bicycle frame tube is arranged in the area of the battery opening for defining an installation position.

11. The bicycle battery assembly according to claim 1, wherein the installation aid is integrally formed with the battery housing.

12. A bicycle battery assembly,
a bicycle frame tube,
a battery adapted to be inserted, in a longitudinal direction of the bicycle frame tube, into the latter through a battery opening, and
an installation aid connected to the battery and/or the bicycle frame tube,
wherein the installation aid comprises a locating surface which cooperates with an abutment surface provided at the bicycle frame tube or the battery and the locating surface or the abutment surface are funnel-shaped in the longitudinal direction.

13. A bicycle battery assembly,
a bicycle frame tube,
a battery adapted to be inserted, in a longitudinal direction of the bicycle frame tube, into the latter through a battery opening, and
an installation aid connected to the battery and/or the bicycle frame tube,
wherein the installation aid comprises a locating surface which cooperates with an abutment surface provided at the bicycle frame tube or the battery and the locating surface or the abutment surface are wedge-shaped in the longitudinal direction.

14. A bicycle battery assembly,
a bicycle frame tube,
a battery adapted to be inserted, in a longitudinal direction of the bicycle frame tube, into the latter through a battery opening, and
an installation aid connected to the battery and/or the bicycle frame tube,
wherein the installation aid comprises a locating surface which cooperates with an abutment surface provided at the bicycle frame tube or the battery and the locating surface or the abutment surface are funnel-shaped transversely to the longitudinal direction.

15. A bicycle battery assembly,
a bicycle frame tube,
a battery adapted to be inserted, in a longitudinal direction of the bicycle frame tube, into the latter through a battery opening, and
an installation aid connected to the battery and/or the bicycle frame tube,
wherein the installation aid comprises a locating surface which cooperates with an abutment surface provided at the bicycle frame tube or the battery and the locating surface or the abutment surface are wedge-shaped transversely to the longitudinal direction.

16. A bicycle battery assembly,
a bicycle frame tube,
a battery adapted to be inserted, in a longitudinal direction of the bicycle frame tube, into the latter through a battery opening, and
an installation aid connected to the battery and/or the bicycle frame tube,
wherein the installation aid comprises a locating surface which cooperates with an abutment surface provided at the bicycle frame tube or the battery and the locating surface or the abutment surface are constituted by a side surface of the bicycle frame tube facing in the longitudinal direction.

* * * * *